United States Patent [19]

DeCaro

[11] Patent Number: 4,762,453
[45] Date of Patent: Aug. 9, 1988

[54] HELICAL COIL FASTENER

[75] Inventor: Charles J. DeCaro, Charlotte, N.C.

[73] Assignee: Textron, Inc., Providence, R.I.

[21] Appl. No.: 917,652

[22] Filed: Oct. 10, 1986

Related U.S. Application Data

[63] Continuation-in-part of Ser. No. 823,724, Jan. 29, 1986, abandoned.

[51] Int. Cl.⁴ .......................... F16B 35/00; E04B 5/00
[52] U.S. Cl. ................................ 411/383; 411/392; 411/410; 411/17; 52/410
[58] Field of Search ..................................... 411/16–18, 411/178, 368, 386, 410, 392, 397, 438, 341–343, 383, 396; 52/410.

[56] References Cited

U.S. PATENT DOCUMENTS

| | | | |
|---|---|---|---|
| 848,576 | 3/1907 | Stephens | 81/3.15 |
| 2,458,778 | 1/1949 | Hines | 81/3.09 |
| 4,242,932 | 1/1981 | Barmore | 411/410 |
| 4,318,651 | 3/1982 | Ragen | 411/342 |
| 4,403,895 | 9/1983 | Caldwell et al. | 411/908 |
| 4,437,286 | 3/1984 | Maguire | 411/392 |
| 4,453,361 | 6/1984 | Hulsey | 411/386 |
| 4,616,455 | 10/1986 | Hewison | 52/512 |

FOREIGN PATENT DOCUMENTS

| | | | |
|---|---|---|---|
| 249955 | 10/1966 | Austria | 411/16 |
| 908906 | 4/1954 | Fed. Rep. of Germany | 411/16 |
| 1907793 | 9/1969 | Fed. Rep. of Germany | 411/438 |
| 125922 | 5/1928 | Switzerland | 411/438 |
| 23521 | of 1897 | United Kingdom | 411/438 |

*Primary Examiner*—Neill Wilson
*Attorney, Agent, or Firm*—Webb, Burden, Ziesenheim & Webb

[57] ABSTRACT

A fastener having a retaining member with a top portion and an elongated hub extending downwardly from the top portion. A helical groove extends throughout a substantial portion of the length of the hub and the upper end of the helical groove is formed to change the lead between the upper end of the helical groove and at least the uppermost loop of a helical coil mounted in the helical groove to create a tensile load on the hub by a helical coil having at least the uppermost loop located in the helical groove. A helical coil with a plurality of loops has at least the uppermost loop located in the helical groove in the hub, and the end portion of the uppermost loop contacts the portion of the groove formed to change the lead to create a tensile load on the hub to mount the helical coil on the hub.

19 Claims, 3 Drawing Sheets

HELICAL COIL FASTENER

This application is a continuation-in-part of application Ser. No. 823,724 filed Jan. 19, 1986, now abandoned.

BACKGROUND OF THE INVENTION

1. Field of the Invention

This invention relates generally to helical coil fasteners for securing insulation or other material to a roof deck. More particularly, the invention is directed to helical coil fasteners for securing insulation material to a tectum or to a light gauge metal roof deck.

2. Description of the Prior Art

Roofs are made of various materials with appropriate fasteners to secure insulation to the upper surface of a roof deck. Some roof decks are made of metal sheets, and others are made of a composite pressed fibrous material called tectum which offers relatively little resistance to the pull-out of conventional screws used to attach insulation to a tectum. The insulation in turn is normally covered with a single ply plastic material.

Attempts have been made to overcome the problem of pull-out by using screws with large diameters and providing a deep thread which contacts the tectum, but the large screws are not completely satisfactory. Such screws cannot be made by normal heading equipment and they require special tools for insulation. The INSUL-FIXX plastic stress plate and screws manufactured and sold by Townsend Division of Textron Inc. and disclosed in U.S. Pat. No. 4,361,997, which is owned by the assignee of the instant application, is excellent for securing insulation to sheet metal roof decks but is not as effective with tectum and other materials of similar strength.

SUMMARY OF THE INVENTION

A helical coil fastener attaches insulation to a tectum or similar material, or to a light gauge sheet metal roof deck. Because of its size and configuration, the helical coil fastener contacts substantially more surface area of the tectum and the insulation when it is threaded through the insulation and the tectum than is contacted by the threads of a conventional screw. Helical coil fasteners may be used alone or in conjunction with a plastic retaining member having a top portion and a hub depending from the bottom surface of the top portion. A helical coil fastener is attached to the hub by a helical groove formed in the exterior surface of the hub. The upper surface of the top portion of the retaining member is provided with a centrally located recess having a hub for receiving a fastener driving tool so that the helical coil fastener can be quickly driven through the insulation and tectum. In another embodiment, the retaining member is attached, as by threading, to the helical coil fastener after the fastener is screwed into position in the deck. The helical coil fastener may be made in a number of configurations. For example, the loops of the coil may be of uniform pitch and diameter, the upper loops may be in contact with each other, the coils may be tapered toward the entry end, or the lower loops may be of a larger diameter than the upper loops. The bottom loop may terminate in a straight lower portion extending along the central axis. Either a straight pointed end of a self-tapping threaded end may be provided at the bottom of the helical coil fastener. The smaller diameter end portion and the pointed end act as a pilot or a drill point respectively for locating the helical coil fastener on a pre-drilled or a light gauge metal roof deck. The wire forming the coils may be round, triangular, rectangular or of other cross section.

BRIEF DESCRIPTION OF THE DRAWINGS

In the following description of the different embodiments of the invention, like reference numerals refer to like parts throughout.

DESCRIPTION OF THE PREFERRED EMBODIMENTS

Figure 1:
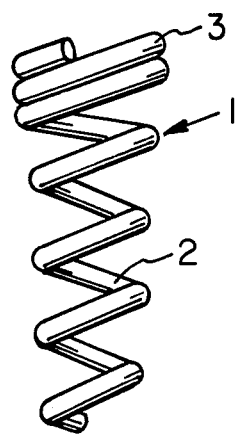
FIG. 1 is an elevation of a helical coil fastener having larger diameter and engaging loops at the upper end.
Figure 2:
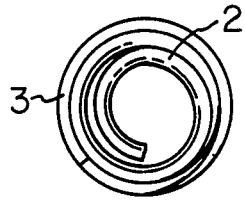
FIG. 2 is a plan view of the fastener shown in FIG. 1.

FIGS. 1 and 2 of the drawings show a helical coil fastener 1 having a plurality of loops 2 extending from the upper end of the coil to the lower end of the coil. The two loops 3 at the upper end of the coil are in engagement with one another and are formed with a larger diameter than the lower loops 2 in order to receive a fastener driving tool (not shown). Such a tool would include a pilot end for entering the loops and a vertical abutment shoulder for engaging the exposed face of the top loop. When the helical coil is inserted into insulation and a tectum made of a composite pressed fibrous material, the loops 2 and 3 contact a substantially larger portion of the insulation and the tectum than a regular threaded fastener, and the increased surface contact firmly holds the fastener in the insulation and the tectum.

Figure 3:
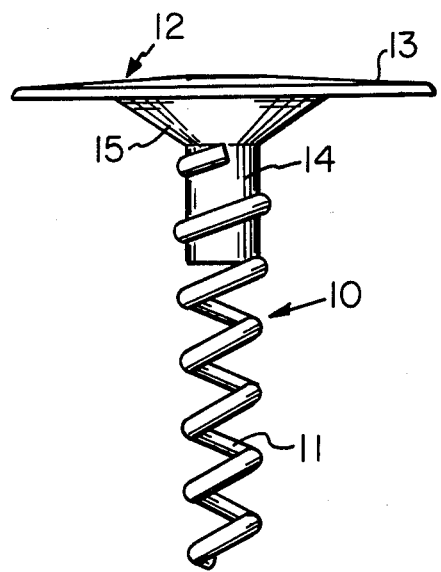
FIG. 3 is an elevation of a helical coil fastener attached to the hub of a retaining member.
Figure 4:
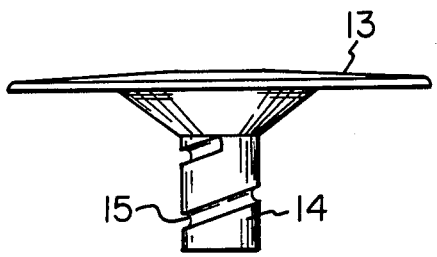
FIG. 4 is an elevation of the retaining member shown in FIG. 3.
Figure 5:
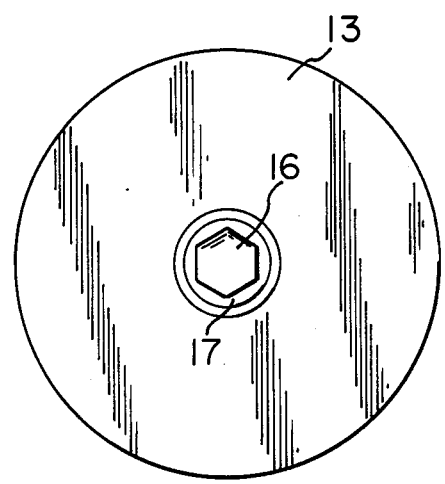
FIG. 5 is a plan view of the retaining member shown in FIG. 4 showing a drive connection.
Figure 9:
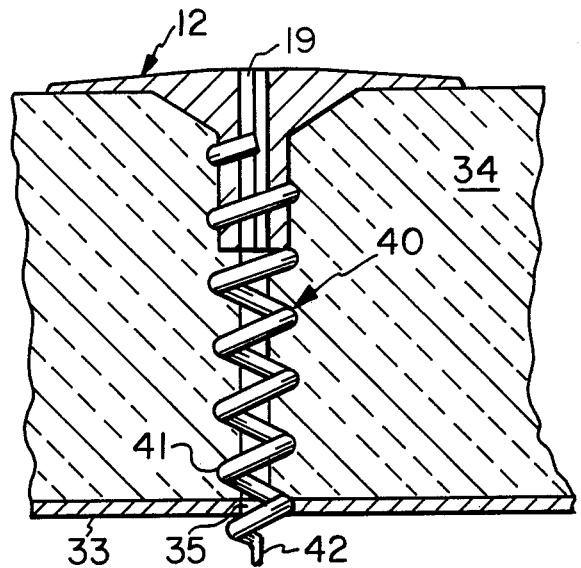
FIG. 9 is a section through a roof deck having insulation on a light gauge sheet metal base and another modified helical coil fastener fully installed.

FIG. 3 of the drawings shows a fastener wherein a helical coil 10 having a plurality of loops 11 of constant pitch and diameter is connected to a plastic retaining member 12 which has a top portion 13 and an integral depending hub 14. The retaining member 12 is shown in FIGS. 4 and 5 of the drawings without the helical coil wherein it can be seen that hub 14 is formed with a continuous helical groove 15 which has the same pitch and diameter as helical coil 10 to receive the upper loops of helical coil 10 to firmly hold the helical coil onto the plastic retaining member. The direction of groove 15 and hence the helical coil which fits therein is such that when the fastener is tightened in the insulation in a clockwise direction as viewed from the top, the helical coil tends to remain in groove 15. The top portion 13 of retaining member 12 is formed with a hexagonal-shaped hub 16 located in a cylindrical recess 17. The hub 16 is adapted to receive the socket head of a fastener driving tool to insert the fastener into the insulation and/or a tectum. The hub could be formed with a blind or clear through hexagonal bore to receive an allen-type socket. A clear through bore 19 is illustrated in the embodiment of FIG. 9.

The retaining member is made from a thermoplastic or thermosetting resinous material or any other material capable of withstanding a driving torque. It must be somewhat yieldable and yet possess sufficient memory to not retain a permanent set under routine loading conditions. It must also have adequate shear strength to insure that the hub is not sheared off by high winds, etc. The preferred material is an acrylonitrile butadiene styrene thermoplastic commonly known as "ABS." The material should also be selected on the basis of the temperature conditions to which the retaining member will be exposed.

The helical coil is normally made from a spring steel. The coil should be substantially rigid and have a high spring rate to withstand the normally applied installation loads without any appreciable deformation. The coil can have a cross section which is circular, triangular, rectangular or the like.

Figure 6:
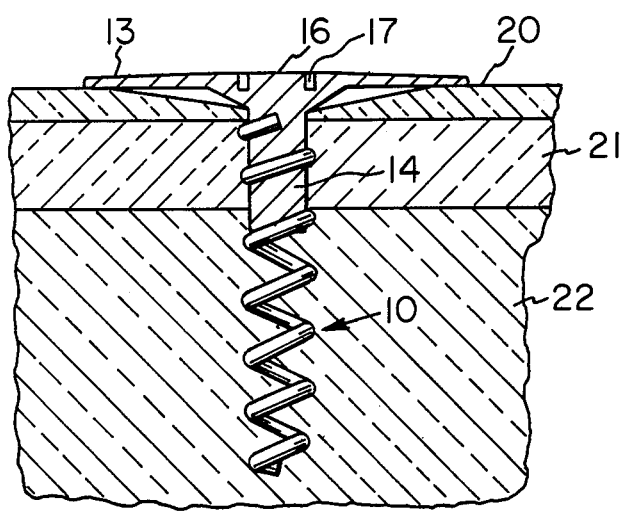
FIG. 6 is a section through a tectum showing a helical coil fastener and a retaining member holding insulation on the tectum.

FIG. 6 of the drawings shows the fastener shown in FIG. 3 inserted into a tectum 22 through a layer of insulation 21 on its upper surface. The insulation 21 may be wood fiber, perlite, fiberglass, foamglass, fesco foam, hy-tec, isotherm or exotherm extra, all of which are commercially available insulating materials. A sheet 20 of pressboard is located above insulation 21. Where one or more of the layers is not easily deformable, it can be pre-drilled to accommodate hub 14.

Figure 7:
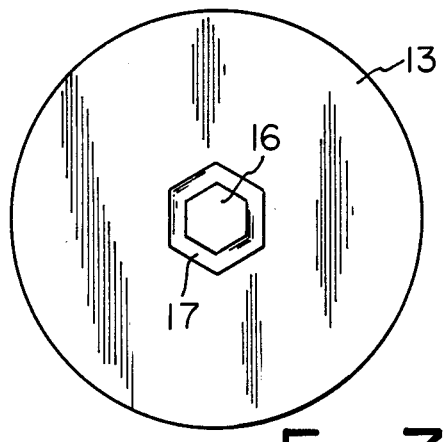
FIG. 7 is a plan view of a retaining member with a modified drive connection.

FIG. 7 of the drawings shows the top portion 13 of a plastic retaining member 12 with a modified fastener drive connection. The connection shown in FIG. 7 has a hexagonal hub portion 18 similar to that shown in FIG. 5 of the drawings, but the outer wall of the recess 17 is hexagonal in shape in order to cooperate with the head of a fastener driving tool having a hexagonal exterior. This allows for easy removal of the fastener even if the main hub 16 becomes damaged.

Figure 8:
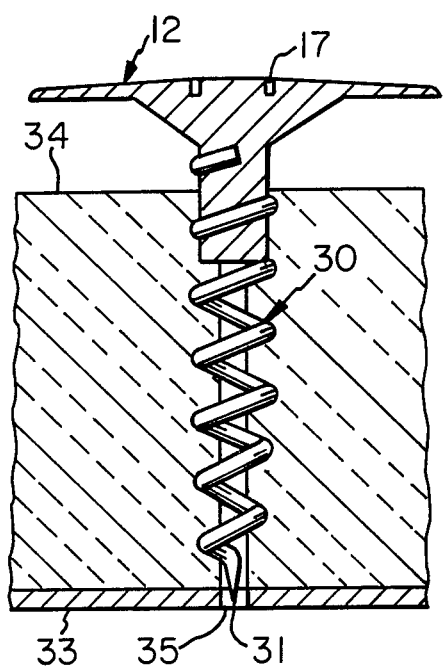
FIG. 8 is a section through a roof deck having insulation on a light gauge sheet metal base and a modified helical coil fastener.

FIG. 8 of the drawings shows a modified helical coil fastener 30 attached to the depending hub of a plastic retaining member 12. The helical coil 30 is the same as helical coil 10 shown in FIG. 3 of the drawings except that the lower end of the coil is formed with a downwardly directed point 31 located on the center line of the coil. The purpose of point 31 is to act as a guide when the fastener is used to connect insulation 34 to a light gauge sheet metal roof deck 33 on the upper surface thereof. The insulation and sheet metal roof deck are predrilled with a plurality of pilot holes 35, only one of which is shown in FIG. 8 of the drawings, and since the pointed end 31 of helical coil 30 is located on the center line of the helical coil, the pointed end passes through pilot hole 35, and the fastener is connected to the roof deck and is properly positioned on the roof deck to hold insulation 34 in place.

It is also possible to pre-drill holes in the tectum, and utilize a coil fastener in which the diameter of the last loop is equal to or less than the pre-drilled hole. In such an embodiment, a straight section such as point 31 is not needed.

FIG. 9 of the drawings shows another embodiment of a fastener for use with a light gauge metal roof deck 33 having pilot holes 35 to attach insulation 34 to the metal roof deck. In FIG. 9, the helical coil 40 has the last few loops 41 formed with a smaller diameter than one rest of the loops in the coil. The lower end 42 of helical coil 40 is bent to be parallel with the center line of the coil and is located on the center line of the coil. The reduced diameter end portion 42 of helical coil 40 passes through pilot hole 35 to connect the fastener with the metal roof deck and to properly hold the insulation 34 in place. This embodiment is also effective for lightweight concrete insulation which can be poured on top of metal deck 33. Thereafter, a pilot hole is formed through the concrete insulation and metal deck and the tapered fastener is threaded therethrough.

Figure 10:
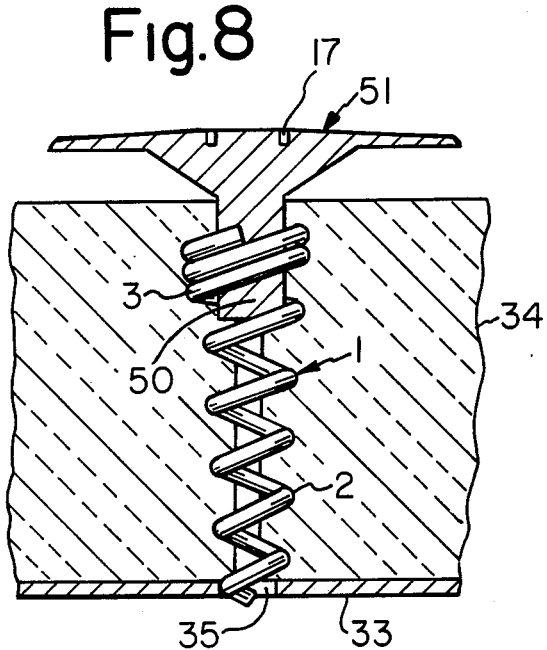
FIG. 10 is a section through a roof deck having insulation on a light gauge sheet metal base showing a helical coil fastener with a separate retaining member attached to the fastener.

FIG. 10 of the drawings shows a helical coil fastener 1 inserted through insulation 34 supported on a light gauge sheet metal roof deck 33. The retaining member 51 is not pre-attached to fastener 1 but is attached by threading after fastener 1 is in place. The hub 50 of retaining member 51 is longer than the hub of a pre-attached retaining member in order to contact and engage the loops 2 of the fastener below the upper large diameter loops 3. The upper portion of the hub 50 is located within the large diameter loops 3 without any contact therewith, and the lower loops 2 of the helical coil fastener are threaded into the spiral groove formed in the exterior surface of the hub. In utilizing the helical coil fastener 1, a driver with a pilot driving head and vertical shoulder abutment is placed within the large diameter loops until the lower end of the driving head contacts the top of the uppermost loop 2 and the vertical shoulder contacts the two large diameter loops 3 so that rotation of the driver will rotate the fastener through the insulation. After the fastener is fully inserted into the insulation, the driver is removed and the hub 50 is placed in position and threaded on the loops 2.

Figure 11:
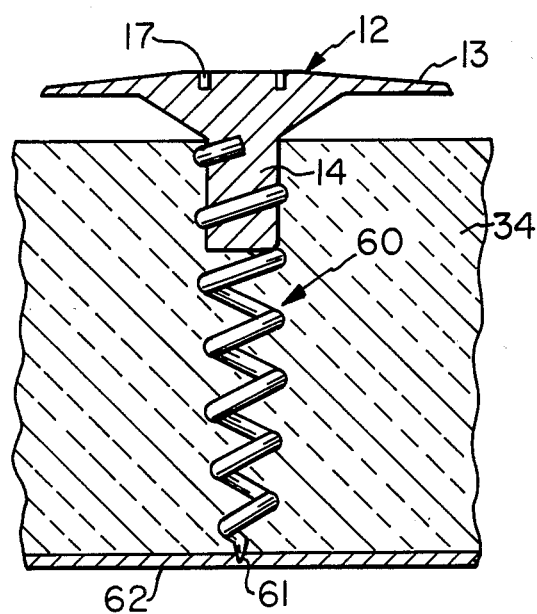
FIG. 11 is a section through a roof deck having insulation on a light gauge sheet metal base having a helical coil fastener with a self-tapping drill point.

FIG. 11 of the drawings shows a fastener 60 formed with a self-drilling threaded point 61 on its lower end so that when the fastener is inserted through the insulation 34, the end 61 will thread through the imperforate light gauge sheet metal roof deck 62 to attach the insulation to the roof deck. Point 61 can be formed by pinching the end of the last loop to form a drill point.

Figure 12:
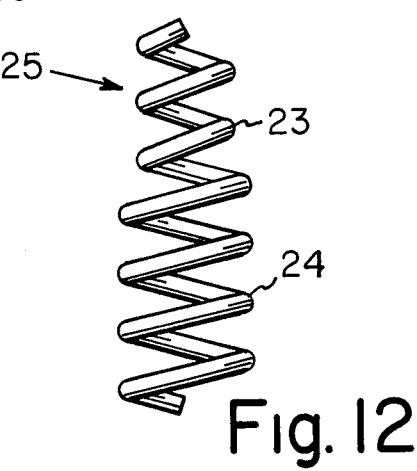
FIG. 12 is an elevation of a modified helical fastener having larger diameter lower loops.

The embodiment of FIG. 12 maximizes the holding power of the helical fastener 25 which will become embedded in insulation and tectum. Fastener 25 is formed of loops of the same pitch but of two different diameters. For example, upper loops 23 are of a smaller diameter (e.g. ½ inch) than lower loops 24 (e.g. ⅝ inch). The larger lower loops 24 provide a greater holding resistance within the insulation and tectum.

Figure 13:
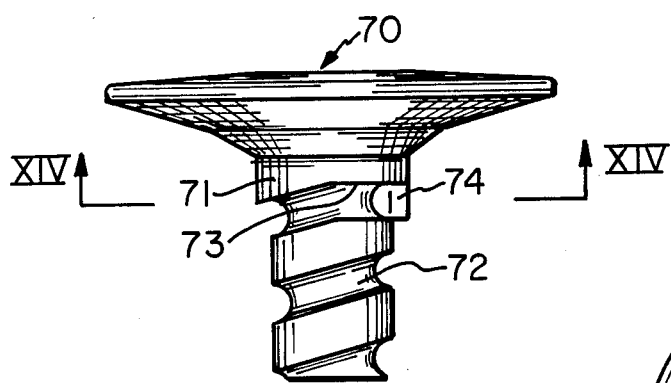
FIG. 13 is an elevation of a modified retaining member having a flat and a stop.
Figure 14:
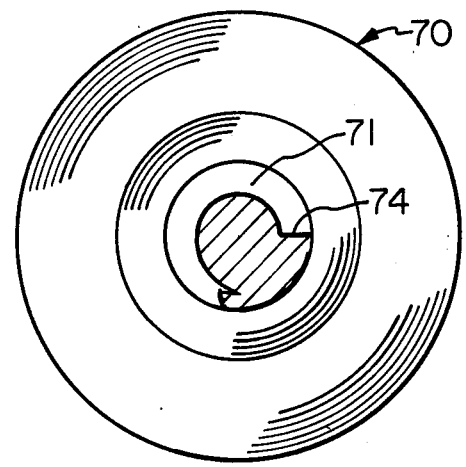
FIG. 14 is a section on line XIV—XIV of FIG. 13.

FIGS. 13 and 14 of the drawings show a modified retaining member 70 which has a depending hub 71 having a continuous helical groove 72 formed therein for receiving the upper coils of a helical coil fastener. The upper end of helical groove 72 has a flat ramp 73 on its upper surface adjacent to the end of the groove for deflecting the end portion of the uppermost loop of the fastener in the axial direction to create a tensile load on hub 71 to firmly hold the helical coil fastener on the hub of the retaining member.

Figure 15:
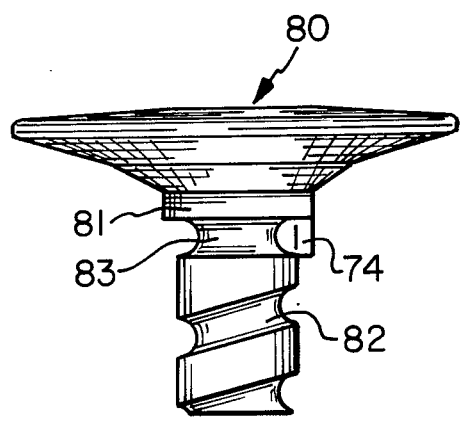
FIG. 15 is an elevation of a modified retaining member having the top groove perpendicular to the axis.

In FIG. 15 of the drawings, the modified retaining member 80 has a depending hub 81 formed with a continuous helical groove 82 for receiving the upper coils of a helical coil fastener. The upper end 83 of groove 82 is formed perpendicular to the axis of hub 81 in order to deflect the uppermost loop of the helical coil to place a tensile load on hub 81 to firmly hold the helical coil fastener on the hub of the retaining member.

Figure 16:
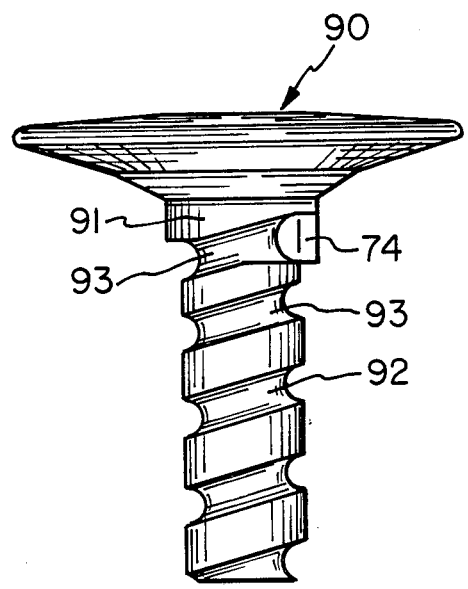
FIG. 16 is an elevation of a modified retaining member having the top grooves closer together than the remaining grooves.

The modified retaining member 90 shown in FIG. 16 of the drawings has a depending hub 91 formed with a continuous helical groove 92 which receives the upper coils of a helical coils fastener. The top two threads 93 of the helical groove 92 are closer together than the remaining threads in the helical groove. The spacing of threads 93 compresses the upper two coils of the helical coil fastener to create a tensile force between the hub 91 and the upper two coils. While the upper two threads of the helical coil fastener are shown closer together than the other threads in FIG. 16, it will be understood by those skilled in the art that a greater number of threads may be formed with closer spacing.

The design of the upper end of the continuous helical groove shown in FIGS. 13, 15 and 16 of the drawings create a tensile force between the hub of the retaining member and at least the upper helical coil fastener which resists separation of the two members. The resistance to separation of the helical coil fastener from the retaining member is obtained by the mismatch between the lead of the upper end of the helical groove formed in the hub of the retaining member and the lead of the helical coil fastener. Retaining members having hubs with the upper end of the helical groove formed in the manner shown in FIG. 13 of the drawings were tested to determine the resistance to separation of the hub from a helical coil fastener fitted thereon. The tests were conducted by holding the fastener stationary and removing the retaining member with a torque wrench. The tests showed that a torque of 15-20 Inch Lbs. was required to remove the fastener having the upper end of the helical groove formed in the manner shown in FIG. 13, whereas a torque of only 5-7 Inch Lbs. was required to remove a fastener from a retaining member having a helical groove formed without an upper end as shown in FIG. 13 of the drawings. Thus, the tests results show that forming the upper end of the helical groove as shown in FIG. 13 increases the tensile load placed on the hub of the retaining member by the helical coil.

The retaining members shown in FIGS. 13-16 of the drawings may be formed with a drive connection on the top surface as shown in either FIG. 5 or FIG. 7 of the drawings and may have a bore as shown in FIG. 9 of the drawings. A helical coil fastener with constant size loops such as shown in FIGS. 3, 6, 8, 9 and 11 will be used with the retaining members shown in FIGS. 13-16 of the drawings.

The retaining members shown in FIGS. 13-16 of the drawings have a stop or abutment 74 located at the upper end of the helical groove which acts to prevent the end of the upper coil of the helical coil from riding up on the frustoconical lower surface of the top portion of the retaining member which prevents damage to the retaining member.

While preferred embodiments of the invention have been described herein, it is to be understood that the invention may be embodied within the scope of the appended claims.

I claim:

1. A fastener for attaching insulation to a roof deck, said fastener comprising a retaining member having a top portion with an upper surface and a lower surface, an elongated hub integral with said top portion and extending downwardly from the lower surface of said top portion, said hub having a helical groove formed therein extending throughout a substantial portion of its length, the upper end of said helical groove having means to create a tensile load on said hub by a helical coil having at least the uppermost loop located in said helical groove on said hub, a helical coil having a plurality of loops, at least the uppermost loop of said helical coil located in said helical groove formed in said hub, the end portion of at least the uppermost loops of said helical coil contacting said means to create a tensile load on said hub to firmly mount said helical coil on said hub and the lower loops of said helical coil extending downwardly below the end of said hub, the lower end of the lowermost loop of said helical coil being formed with a point lying on the center line of said helical coil, said lower end being substantially parallel to the center line of said helical coil and self-tapping threads are formed along said lower end, whereby said helical coil is adapted to be screwed through insulation into a roof deck to hold insulation onto the roof deck and said self-tapping threads are adapted to penetrate the roof deck to attach said fastener to said roof deck.

2. A fastener as set forth in claim 1 wherein said helical groove formed in said hub has substantially the same pitch as said helical coil except for said means to create a tensile force on said hub.

3. A fastener as set forth in claim 1 wherein the lower end of the lowermost loop of said helical coil is formed with a point lying on the center line of said helical coil and is substantially parallel to the center line of said helical coil, whereby said pointed end is adapted to pass through a pilot hole in a light gauge sheet metal roof deck to attach said fastener to said roof deck.

4. A fastener as set forth in claim 1 wherein the lowermost loops of said helical coil are formed with a smaller diameter than the other loops in said helical coil and the lower end of the lowermost loop of said helical coil has a portion lying on the center line of said helical coil and parallel to the center line of said helical coil, whereby said lower end cooperates with a pilot hole formed in a light gauge metal roof deck to attach said fastener to said roof deck.

5. A fastener as set forth in claim 1 wherein said upper surface of said top portion of said plastic retaining member is formed with connecting means adapted to receive a fastener driving tool to drive said fastener.

6. A fastener as set forth in claim 5 including a recess formed in said top portion of said retaining member and said connecting means is a hexagonal hub located within said recess.

7. A fastener as set forth in claim 6 wherein said recess has a cylindrical transverse cross section.

8. A fastener as set forth in claim 6 wherein said recess has a hexagonal transverse cross section adapted to be driven by a fastener driving tool having a hexagonal exterior shape.

9. A fastener as set forth in claim 6 wherein said connecting means is a bore for receiving the driving tool.

10. A fastener as set forth in claim 1 wherein said hub has stop means formed therein at the upper end of said helical groove, whereby said stop means contacts the free end of the uppermost loop of said helical coil to prevent the end of said helical coil from contacting said lower surface of said top portion of said retaining member.

11. A fastener as set forth in claim 1 wherein said means to create a tensile force on said hub is a flat ramp formed on the upper surface of the upper end of said helical groove.

12. A fastener as set forth in claim 1 wherein said means to create a tensile force on said hub is the upper groove of said helical groove being formed perpendicular to the axis of said hub.

13. A fastener as set forth in claim 1 wherein said means to create a tensile force on said hub is at least the upper two threads of said helical groove having a smaller pitch than the remaining threads of said helical groove.

14. A fastener for attaching insulation to a roof deck, said fastener comprising a retaining member having a top portion with an upper surface and a lower surface, an elongated hub integral with said top portion and extending downwardly from the lower surface of said top portion, said hub having a helical groove formed therein extending throughout a substantial portion of its length, the upper end of said helical groove formed in said hub having means changing the lead between the upper end of said helical groove and at least the uppermost loop of a helical coil adapted to be mounted in said helical groove to create a tensile load on said hub by a helical coil having at least the uppermost loop located in said helical groove formed in said hub, stop means formed on said hub at the upper end of said helical groove, a helical coil having a plurality of loops, the uppermost loop of said helical coil having a free end and at least the uppermost loop of said helical coil being located in said helical groove formed in said hub and the end portion of at least the uppermost loop of said helical coil contacting said means to change the lead to create a tensile load on said hub to firmly mount said helical coil on said hub, said stop means on said hub contacting the free end of the uppermost loop of said helical coil to prevent the end of said helical coil from contacting said lower surface of said top portion of said retaining member and the lower loops of said helical coil extending downwardly below the end of said hub, whereby said helical coil is adapted to be screwed through insulation into a roof deck to hold insulation onto the roof deck.

15. A fastener as set forth in claim 14 wherein said means changing the lead is a flat ramp formed on the upper surface of the upper end of said helical groove.

16. A fastener as set forth in claim 14 wherein said means changing the lead is the upper groove of said helical groove being formed perpendicular to the axis of said hub.

17. A fastener as set forth in claim 14 wherein said means changing the lead is at least the upper two threads of said helical groove having a smaller pitch than the remaining threads of said helical groove.

18. A fastener for attaching insulation to a roof deck, said fastener comprising a plastic retaining member having a top portion with an upper surface and a lower surface, a hub integral with said top portion and extending downwardly from the lower surface of said top portion and a helical coil having a plurality of loops extending downwardly from said hub having a helical groove formed therein having substantially the same pitch as said helical coil and at least the uppermost loops of said helical coil being located in said helical groove, the lower end of the lowermost loop of said helical coil being formed with a point lying on the center line of said helical coil and said lower end being substantially parallel to the center line of said helical coil and self-tapping threads formed along said lower end, whereby said helical coil is adapted to be screwed through the insulation into the roof deck and said self-tapping threads are adapted to pass through a pilot hole in a light gauge sheet metal roof deck to attach said fastener to the roof deck to hold the insulation onto the roof deck.

19. A fastener as set forth in claim 18 wherein said helical coil is substantially with a high spring rate and the lowermost loops of said helical coil are formed with a smaller diameter than the other loops of said helical coil.

* * * * *

UNITED STATES PATENT AND TRADEMARK OFFICE
CERTIFICATE OF CORRECTION

PATENT NO. : 4,762,453

DATED : August 9, 1988

INVENTOR(S) : Charles J. DeCaro

It is certified that error appears in the above-identified patent and that said Letters Patent is hereby corrected as shown below:

Column 1 Line 5 "19" should read --29--.

Column 1 Line 66 "of" should read --or--.

Column 3 Line 51 "18" should read --16--.

Column 4 Line 15 "one" should read --the-- (second occurrence).

Claim 19 Column 8 Line 41 after "substantially" insert --rigid--.

Signed and Sealed this

Fourteenth Day of March, 1989

Attest:

DONALD J. QUIGG

*Attesting Officer*   *Commissioner of Patents and Trademarks*